(12) United States Patent
Hermann

(10) Patent No.: US 6,718,280 B2
(45) Date of Patent: Apr. 6, 2004

(54) MEASUREMENT DEVICE FOR DETERMINING THE THREE-DIMENSIONAL ORIENTATION OF A BODY RELATIVE TO A REFERENCE DIRECTION

(75) Inventor: Michael Hermann, Villingen (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 10/107,804

(22) Filed: Mar. 28, 2002

(65) Prior Publication Data

US 2002/0165688 A1 Nov. 7, 2002

(30) Foreign Application Priority Data

Mar. 28, 2001 (DE) ......................................... 101 15 548

(51) Int. Cl.⁷ .............................................. G01C 17/00
(52) U.S. Cl. .................................................... 702/153
(58) Field of Search ........................... 702/94, 95, 150, 702/151, 152, 153, 155; 356/149, 467, 459; 73/1.77, 503.3

(56) References Cited

U.S. PATENT DOCUMENTS

| | | | | |
|---|---|---|---|---|
| 4,914,598 A | * | 4/1990 | Krogmann et al. | ........... 701/11 |
| 5,363,700 A | * | 11/1994 | Joly et al. | ................. 73/504.18 |
| 6,195,615 B1 | | 2/2001 | Lysen | |

FOREIGN PATENT DOCUMENTS

| | | |
|---|---|---|
| DE | 42 05 869 A1 | 9/1993 |
| DE | 195 46 405 A1 | 6/1997 |
| DE | 198 00 901 A1 | 7/1999 |
| DE | 198 30 359 A1 | 1/2000 |
| DE | 199 31 868 A1 | 3/2001 |
| DE | 199 49 834 A1 | 4/2001 |
| DE | 100 60 974 A1 | 8/2001 |

OTHER PUBLICATIONS

Orthogonalization of Nonorthogonal Vector Components, Ludvik Pfeifer, Defense Mapping Agency, Washington, DC 20305–3000, pp. 553–559.
Skewed Axis Inertial Sensor Geometry for Optimal Performance, Mark A. Sturza, Litton Systems, Inc., Guidance and Control Systems Division, 5500 Canoga Avenue, Woodland Hills, California 91367–6698, 88–3874–CP, pp. 128–135.
The Effect of Geometry on Integrity Monitoring Performance, Alison Brown and Mark Sturza, NAVSYS Corporation, 18725 Monument Hill Road, Monument, CO 80132, pp. 121–129.

\* cited by examiner

*Primary Examiner*—John Barlow
*Assistant Examiner*—Stephen J. Cherry
(74) *Attorney, Agent, or Firm*—Nixon & Peabody LLP; David S. Safran

(57) ABSTRACT

The three-dimensional orientation of a body relative to a reference direction is determined with increased accuracy by using a gyro-based azimuth and elevation measurement device which has at least four and preferably eight individual gyros. The individual gyros are positioned such that they react to rotary motions in different directions of space. In a first step all orientation measurement values are determined which are made available by three gyros at a time combined into a so-called triad. In a second step these measured values are combined in evaluated or unevaluated form into an overall measurement value of higher precision.

4 Claims, 2 Drawing Sheets

MEASUREMENT DEVICE FOR DETERMINING THE THREE-DIMENSIONAL ORIENTATION OF A BODY RELATIVE TO A REFERENCE DIRECTION

BACKGROUND OF THE INVENTION

1. Field of the Invention

The invention relates to a measurement device for determining the three-dimensional orientation of a body relative to a reference direction. Instead of a body, only the relative angular position of one edge of the body relative to a reference direction can also be measured with the measurement device. In the same way, with the measurement device for example one axis of symmetry of a body can also be measured, for example the alignment of a satellite antenna (ground station) relative to geographical coordinates. In doing so the body can be stationary or movable and can be represented by a motor vehicle or a machine, or by the human body or an animal body or parts thereof. Furthermore the invention relates to one or more processes for making available an overall measurement result from individual measurement results which are made available by subsystems. Moreover, the invention relates to use of the measurement device for determining the three-dimensional orientation of machines or machine elements such as for example rolls or rollers, and for making available correction information in order to move a maladjusted machine or machine element into an aligned position.

2. Description of the Related Art

For purposes of determining the three-dimensional orientation of a body relative to a reference direction and absolutely within an inertial system, it has been known for some time that precision gyro systems can be used. In addition to mechanical gyros, with a precision which is limited by mechanical boundary conditions, for some time optically-based gyros, especially in the embodiment with a so-called ring laser, have been on the market as high precision direction and orientation measurement devices. One such means is known from patent U.S. Pat. No. 6,195,615. Unfortunately the costs of especially precise instruments of this type are considerable, so that it is of significant importance to distinctly improve the cost/benefit relation of these measurement devices. This is the object of this invention. The invention achieves this object in that redundant design of a gyro-equipped inertial direction measurement system improves its functional properties not only with regard to operating reliability, but also especially with respect to accuracy. At the same time, when using less accurate and economical individual gyro systems, production costs are reduced. In other words: the invention, instead of a gyro system consisting of three individual gyros aligned orthogonally to one another, of which each is estimated at roughly 20,000 euros, now calls for providing one such system which consists for example of eight individual gyros located symmetrically around one axis or a center and which now cost only roughly 5000 euros each. Typically, as claimed in the invention all combinations of 3 out of 8 gyros are used for an individual gyro triad in order to take a host of independent directional measurements with gyro triads formed in this way. Since in the indicated example of 3 out of 8 gyros therefore a total of 56 individual measurement systems which can be evaluated for detection of the angular orientation in space can be described, the accuracy of the desired measurement result with respect to drift and other errors can be significantly increased by averaging and other statistical considerations. At the same time, the indicated measurement systems consisting of three individual gyros each can be mutually checked so that individual gyros with impaired measurement properties as claimed in the invention can be identified during regular operation and optionally shut down. As mentioned, at the same time a certain redundancy is present so that a measurement system of the proposed type upon failure of an individual gyro nevertheless continues to be useful, even if with reduced accuracy. Therefore, as claimed in the invention a measurement device for determining the three-dimensional orientation of a body relative to a reference direction is devised which has a housing for resting on the surface or one edge of a body to be measured which is provided with a plurality of gyro systems for determining the proportional rotary motion around one axis of symmetry at a time assigned to them and which is characterized in that at least four, preferably other individual gyros are present within the housing and are oriented or aligned in the respectively different three-dimensional directions, and all combinations of three individual gyros at a time which can be combined into a so-called gyro triad yielding one initial measurement result at a time which identifies the three-dimensional angular orientation of the measurement device or a body which has made contact with it. This arrangement as claimed in the invention is used such that first a plurality of initial measurement results is made available and then from the plurality of initial measurement results in addition an overall measurement result is determined which (compared to the individual initial measurement results) has a significantly more accurate angular orientation of the measurement device or of a body which has made contact with it.

The number of eight individual gyro systems within an overall system as claimed in the invention is not mandatory. For example four, five, six, etc. gyros or a much larger number can also be used. The chosen number of individual gyros should however lead to a compromise with respect to equipment cost and the attainable increase in accuracy. One such compromise depends apparently also on which cost proportion can be estimated for the required individual arithmetic unit.

SUMMARY OF THE INVENTION

As mentioned, as claimed in the invention it is possible to group the provided individual systems symmetrically around an individual preferred axis. It is likewise possible to distribute the orientation of the individual systems according to the symmetry directions of a regular polyhedron or however roughly statistically over the solid angle (4*Pi). But it should be ensured that the individual orientations with respect to a device-fixed coordinate system can be set or measured relatively accurately. Furthermore, it is important that the direction vectors of three individual gyros at a time are not coplanar. As claimed in the invention, the measured values which are determined by the individual gyros typically in an oblique-angled, three-dimensional coordinate system are converted to a rectangular Cartesian coordinate system. In this way, the output measured value can be expressed for example in Euler angles (pitch, yaw and roll). This conversion is done, in the same manner as statistical computations, by the computer provided in the surrounding housing of the measurement device.

BRIEF DESCRIPTION OF THE DRAWINGS

These and other details of the invention are explained using the drawings.

DETAILED DESCRIPTION OF THE INVENTION

Figure 1:
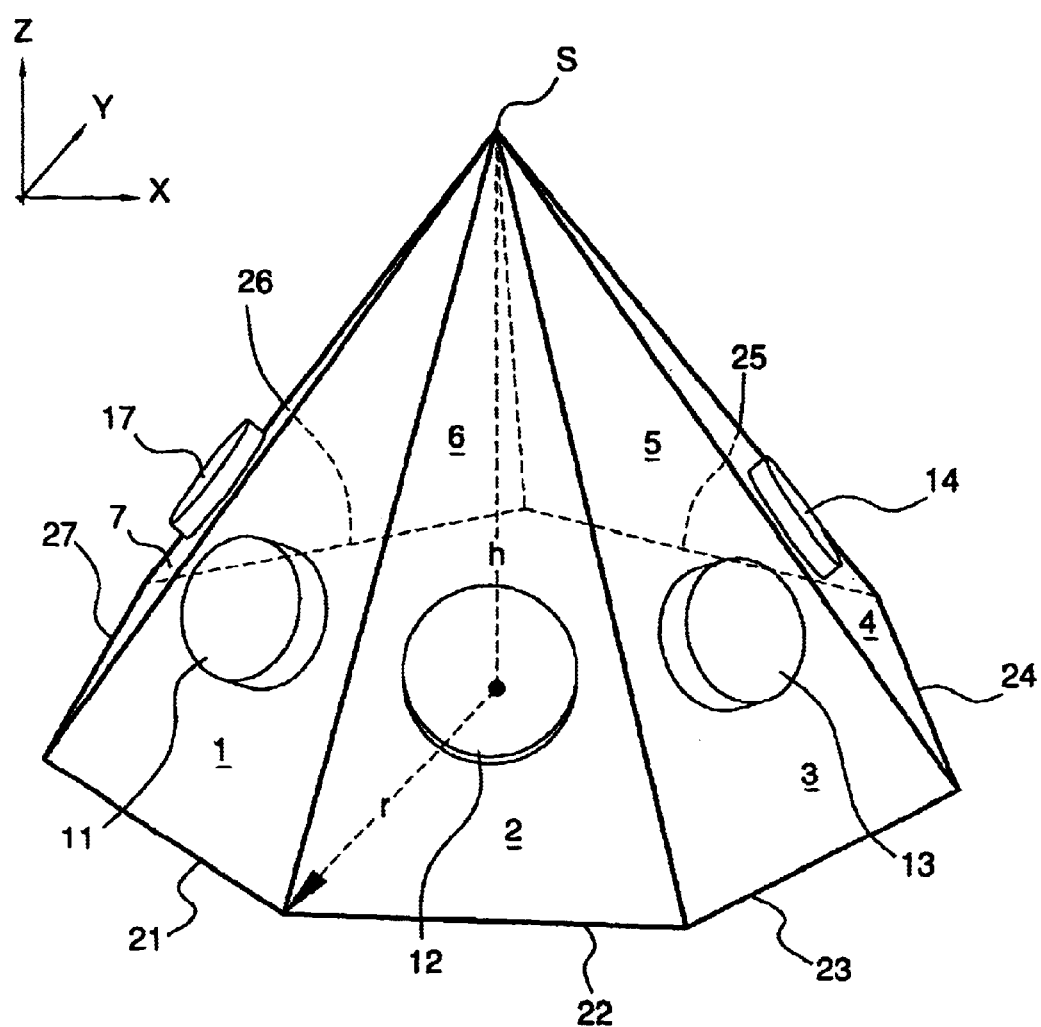
FIG. 1 shows an axially-symmetrical arrangement of 7 individual gyros relative to a x-y-z coordinate system

As is apparent from FIG. 1, defined directions in space are defined by a pyramid with respect to a x-y-z coordinate system stipulated to be fixed on the device. Its lateral surfaces 1, 2, 3, 4, 5, 6 and 7 have base edges 21, 22, 23, 24, 25, 26 and 27 which border the base surface of the pyramid. The individual lateral surfaces therefore differ distinctly in their directional cosine values. If one individual optical gyro at a time (reference numbers 11, 12, 13, 14, 17; the remaining four individual gyros are not shown for reasons of clarity) is mounted on an individual lateral surface (reference numbers 1 to 7), so that one optical ring plane at a time is parallel to the pertinent lateral surface, the directional cosine values of the individual gyros can be accurately given relative to the indicated x-y-z coordinate system. Thus, rotary motion of the device-fixed coordinate system in space can be measured by three optionally chosen gyros at a time (triads) and are displayed after conversion as pitch, yaw and roll values. In any case, the expected accuracy of the individual triads from FIG. 1 is not equivalent, rather certain combinations are distinguished by higher accuracy than for example a triad of directly adjacent gyros 11, 12, 13.

Since in the illustrated configuration a total of 35 gyro triads independent of one another can be given, observation of the indicated rotary motion, moreover also the measurement of the relative position of the body with respect to the reference direction relate to 35 individual measurements. In the ideal case all individual measurements would yield the same result. The individual configurations however, as already described, work with different precision. The individual measurements are therefore preferably combined into an overall value such that the more accurately operating gyros triads are provided with higher weight in the averaging to be carried out. These more accurately operating gyro triads are therefore those with intervals which are not less than 2 positions. Those gyro triads which are directly spaced and which do not have intermediate spaces measure least accurately.

To achieve a measurement result as good as possible, in the indicated arrangement the ratio of the height h to the radius r of the underlying pyramid body should have a value roughly from 0.2 to 1.2. A preferred value is 0.55. For roughly twice the material use compared to the conventional orthogonal gyro triad, therefore as claimed in the invention a result 3 to 4 times more accurate can be obtained. Herein lie the meaning and the important advantage of the invention. One additional advantage of the invention is that measurement devices of the generic type as are used to measure rolls in paper mills and rolling mills are of a rather elongated shape anyway and therefore offer room for more than three individual gyro systems.

In one preferred embodiment of the invention which is not shown, for example eight individual gyros lie on the surfaces of a regular octahedron. In one such arrangement the direction differences between the individual gyros on the average are greater than in the arrangement shown in FIG. 1. In addition, there are no combinations to be evaluated differently, so that one such arrangement works even more efficiently, i.e. at a material cost increased by only roughly 15% a repeatedly improved measurement result is delivered again.

Figure 2:
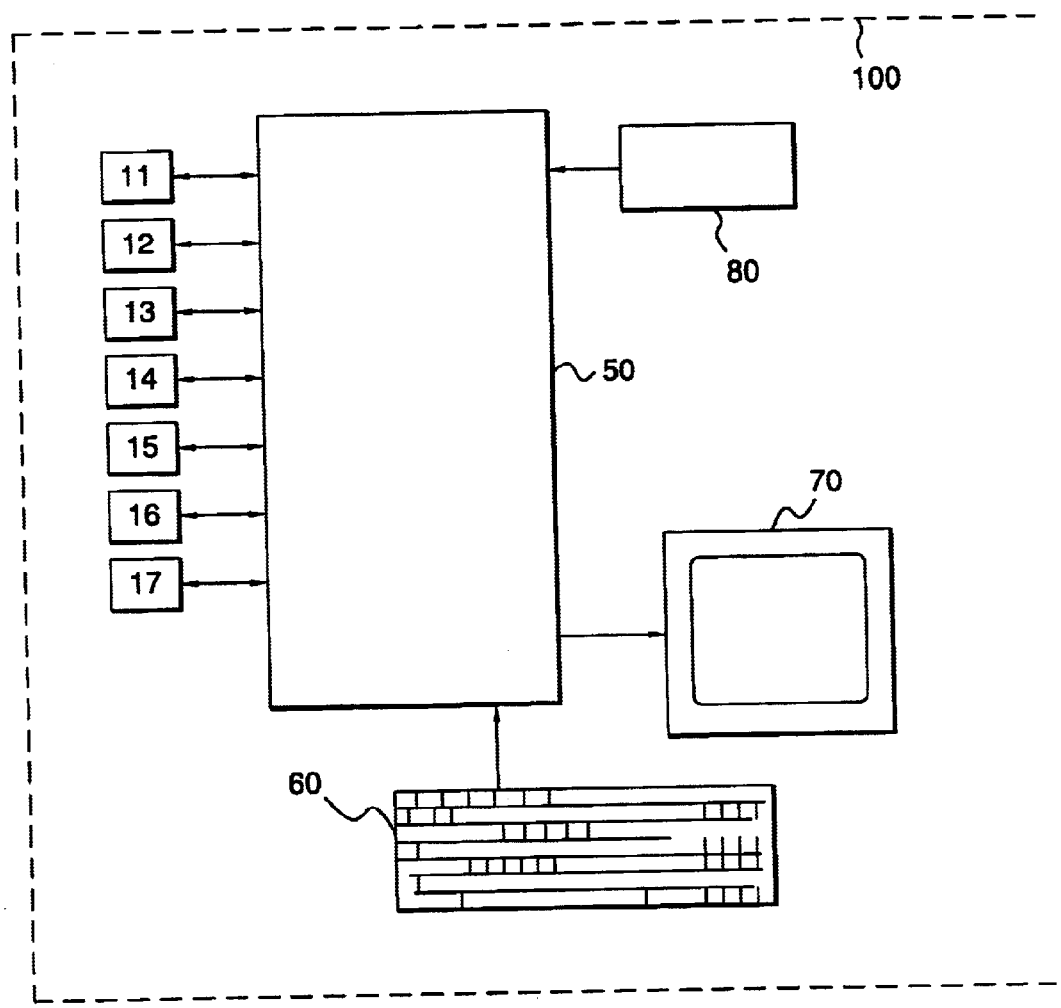
FIG. 2 shows a schematic of a system configuration with 7 individual gyros.

The schematic shown in FIG. 2 shows how an overall system as claimed in the invention is composed of a housing 100, gyros 11 to 17 inclusive located individually in this housing, a computer 50 for interrogation of the gyros and for determining the result in the form of an orientation value which can be displayed on a display screen 70. The overall system is operated preferably by means of a keyboard 60, but there can also be other input means (mouse, trackball, pen, voice, etc.). The overall system is preferably supplied by a battery 80, if necessary there can also be a line connection.

What is claimed is:

1. Measurement device for determining the three-dimensional orientation of a body relative to a reference direction, with a housing for resting on the surface or one edge of a body to be measured, and with a plurality of gyro systems for determining the proportional rotary motion around one axis of symmetry at a time assigned to them, characterized in that at least four, individual gyros are present within the housing and are oriented to different three-dimensional directions, and all combinations of three individual gyros at a time which can be combined into a so-called gyro triad yielding one first measurement result at a time which identifies the three-dimensional angular orientation of the measurement device or a body which has made contact with it so that a plurality of initial measurement results is made available and from the plurality of initial measurement results an overall measurement result is determined it.

2. Measurement device as claimed in claim 1, wherein the different three-dimensional directions relate to one point of symmetry and correspond essentially to the directions of the surface normals of a regular polyhedron in the form of a tetrahedron or an octahedron.

3. Measurement device as claimed in claim 1, wherein the different three-dimensional directions relate to one line of symmetry and correspond essentially to the directions which are defined by the normals of the lateral surfaces of an at least 4-sided pyramid.

4. Measurement device as claimed in claim 2, wherein there are eight individual gyros with predominant axes of symmetry which are aligned parallel to the surface normals of a regular octahedron.

* * * * *